United States Patent [19]
Yamaguchi et al.

[11] Patent Number: 6,166,498
[45] Date of Patent: Dec. 26, 2000

[54] DRIVE UNIT FOR HYBRID VEHICLES

[75] Inventors: Kozo Yamaguchi, Tokyo-to; Yutaka Hotta, Anjo; Takeshi Hara, Anjo; Masayuki Takenaka, Anjo; Koya Maki, Anjo; Hiromichi Agata, Anjo, all of Japan

[73] Assignee: Aisin AW Co., Ltd.

[21] Appl. No.: 09/441,060

[22] Filed: Nov. 16, 1999

[30] Foreign Application Priority Data

Nov. 16, 1998 [JP] Japan ................................. 10-325038
Oct. 18, 1999 [JP] Japan ................................. 11-295658

[51] Int. Cl.[7] ................................................ H02P 1/54
[52] U.S. Cl. .......................... 318/34; 318/376; 180/65.2
[58] Field of Search .................... 318/34, 376; 180/65.2, 180/65.3, 65.4

[56] References Cited

U.S. PATENT DOCUMENTS 5,806,617  9/1998  Yamaguchi ........................... 180/65.2
5,915,488  6/1999  Inoue et al. .......................... 180/65.2
6,070,650  6/1999  Inoue et al. .......................... 318/34

*Primary Examiner*—Karen Masih
*Attorney, Agent, or Firm*—Lorusso & Loud

[57] ABSTRACT

In a drive unit for a hybrid vehicle, a generator-motor is arranged on a first axis and a drive motor is arranged on a second axis in parallel with the first axis. A drive unit casing houses the generator-motor, the drive motor, an inverter unit for the generator-motor and the drive motor and a smoothing condenser for smoothing power source voltage of the inverter unit. The inverter unit is attached to the drive unit casing and is diametrically disposed relative to the generator-motor and the drive motor. The smoothing condenser is attached to the inside of the drive unit casing from which an end portion thereof projects. The inverter unit can be attached to the drive unit casing as a subassembly. By the invention, the drive unit can be made more compact, and the wiring can be simplified.

20 Claims, 16 Drawing Sheets

DRIVE UNIT FOR HYBRID VEHICLES

BACKGROUND OF THE INVENTION

1. Field of the Invention

The present invention relates to a drive unit for a hybrid vehicle.

2. Description of the Related Art

Electrically driven vehicles conventionally have been provided with a drive unit including a drive motor, a generator-motor and an inverter unit. Further, in the inverter for the drive motor formed by a bridge circuit, direct current supplied from a battery is converted into three phase alternating current, and the alternating current is supplied to the drive motor. Further, by an inverter for the generator-motor, formed by a bridge circuit, three phase alternating current supplied from the generator-motor is converted into direct current and the direct current is supplied to the battery.

A pulse-width modulating signal is generated by the control unit and that signal is output to the respective bridge circuits to thereby switch transistors of the respective bridge circuits.

However, it has previously been necessary to provide for separate connection of an inverter to the drive motor and of an inverter to the generator-motor and, accordingly, the drive unit must be sufficiently sized to accommodate such connections.

Further, with a smoothing condenser, common to the respective bridge circuits, for stabilizing voltage generated when the transistors of the respective bridge circuits are switched ON and OFF, the lead wires connecting the respective transistors with the drive motor and the generator-motor are lengthy and the wiring is complicated.

Further, particularly in a drive unit in which a drive motor and a generator-motor are arranged on two different axes, there is no design integrating the inverter for the drive motor, the inverter for the generator-motor and the drive unit casing so that the drive unit is necessarily large-sized.

SUMMARY OF THE INVENTION

Accordingly, it is an object of the invention to provide a drive unit without the aforementioned problems and one which is more compact with simplified wiring.

To achieve the foregoing object, the present invention provides a drive unit including a generator-motor arranged on a first axis, a drive motor arranged on a second axis, in parallel with the first axis, a drive unit casing housing the generator-motor and the drive motor, an inverter unit for the generator-motor and the drive motor and a smoothing condenser for smoothing the power source voltage of the inverter unit.

Preferably, the inverter unit is attached to the drive unit casing and disposed diametrically of the generator-motor and the drive motor. The smoothing condenser is mounted inside the drive unit casing with an end projecting therefrom.

The inverter unit preferably includes an inverter for the generator-motor and a separate inverter for the drive motor, located proximate to the generator-motor and the drive motor, respectively.

A partition wall is optionally provided for attaching the inverter unit with the smoothing condenser mounted so that an end portion projects through the partition wall to the side of the generator-motor. The partition wall may be formed with a bottomed recess projecting to the side of the generator-motor for receiving the smoothing condenser therein.

A portion of the smoothing condenser is preferably disposed on the inner side of a line tangential to both of the generator-motor and the drive motor. In other words, the condenser and the recess holding same project from the partition wall, across the common tangent, to a point closely adjacent the drive motor.

In one embodiment the drive unit according to the invention includes a generator-motor arranged on a first axis, a drive motor arranged on a second axis in parallel with the first axis, a drive unit casing containing the generator-motor and the drive motor, an inverter for the generator-motor and an inverter for the drive motor.

The inverter for the generator-motor and the inverter for the drive motor may be attached to the drive unit casing and disposed radially outward of the generator-motor and the drive motor and contiguous to each other.

In another embodiment, the drive unit of the invention includes a generator-motor, a drive motor, a drive unit casing for housing the generator-motor and the drive motor, a first inverter for operating one of the generator-motor and the drive motor, a second inverter for operating other of the generator-motor and the drive motor, a first lead wire connecting the one of the generator-motor and the drive motor to the first inverter and a second lead wire for connecting the other of the generator-motor and the drive motor to the second inverter.

Preferably, the first and the second inverters are attached to the drive unit casing at positions in which the sum of lengths of the first and the second lead wires, when the first lead wire and the first inverter are connected to each other and the second lead wire and the second inverter are connected to each other, is shorter than the sum of the lengths of the first and the second lead wires when the first lead wire and the second inverter are connected to each other and the second lead wire and the first inverter are connected to each other.

Yet another embodiment of the drive unit according to the invention includes a generator-motor, a drive motor, a drive unit casing for housing the generator-motor and the drive motor, a first inverter for operating one of the generator-motor and the drive motor, a second inverter for operating the other of the generator-motor and the drive motor, a first lead wire connecting one of the generator-motor and the drive motor to the first inverter and a second lead wire connecting the other of the generator-motor and the drive motor to the second inverter.

Preferably, each of the first and the second lead wires connect at the same side of axial ends of the generator-motor and the drive motor.

In another embodiment, the drive unit of the invention includes a gear train housed inside the drive unit casing for transmitting power of the drive motor to a differential unit, wherein at least one of the first and second lead wires is taken out from at least one of the drive motor and the generator-motor in a space outside of the diameter of the gear train and extending over the axial length thereof.

Preferably, the first and the second inverters are arranged in an upper portion of the drive unit casing which is inclined with its front side (relative to the vehicle) being the lower side.

Preferably, a partition wall for attaching the first and the second inverters is provided in the driving apparatus casing with a heat sink associated therewith. Preferably, the partition wall is planar.

Preferably, the first and the second inverters extend within a plane, in parallel with lines respectively tangential to the generator-motor and the drive motor.

In another preferred embodiment of the invention, the first and the second inverters are, respectively, an inverter for the generator-motor and an inverter for the drive motor.

In yet another preferred embodiment, the first and the second inverters are, respectively, an inverter for the drive motor and an inverter for the generator-motor.

DESCRIPTION OF THE PREFERRED EMBODIMENTS

Figure 1:
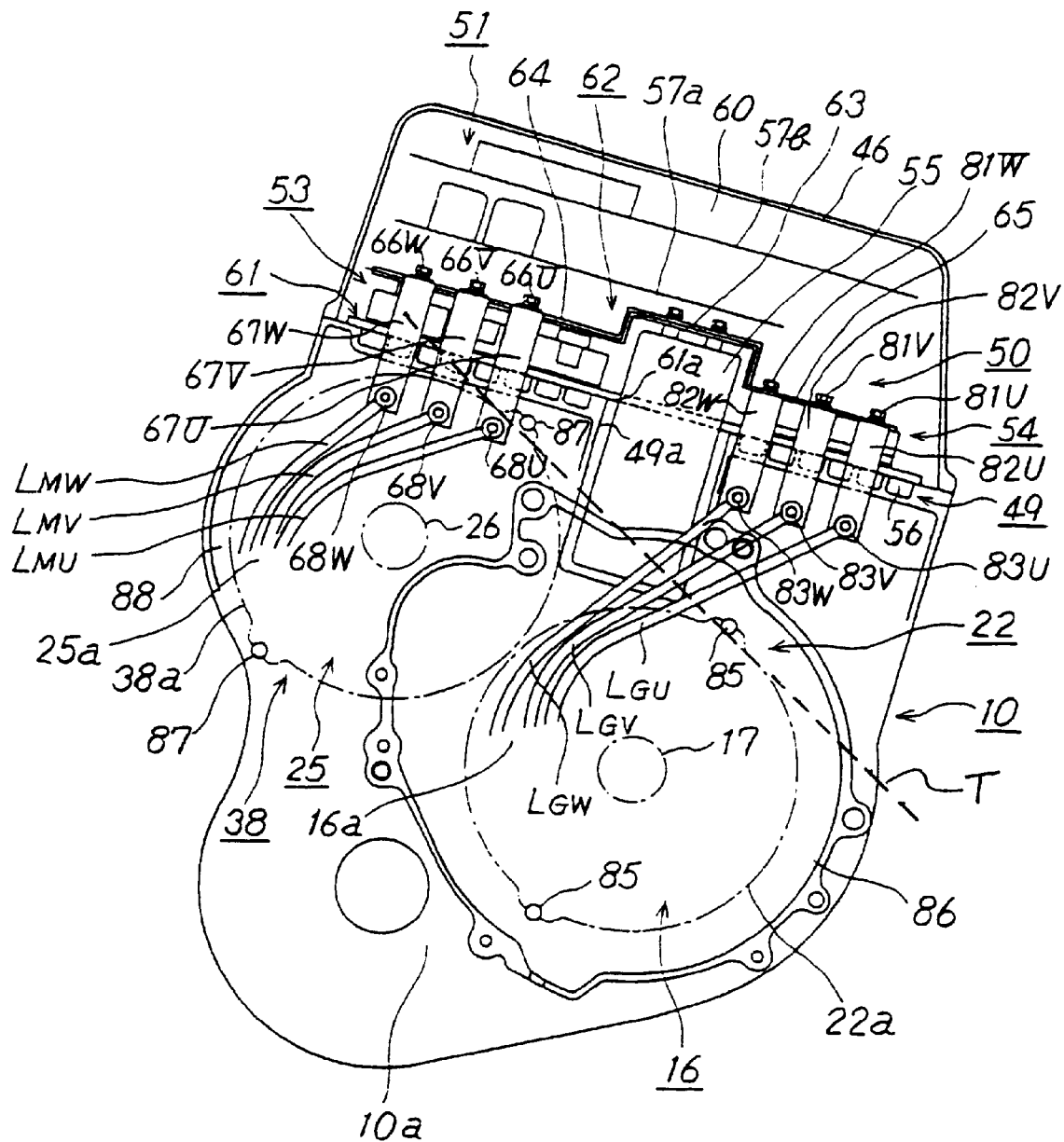
FIG. 1 is a sectional view of a drive unit according to a first embodiment of the invention.

A detailed explanation follows of preferred embodiments of the invention, with reference to the drawings. In these preferred embodiments, the invention is applied to a vehicle having an engine, a drive motor and a generator-motor, that is, a hybrid type vehicle.

A first embodiment of the invention is shown in FIGS. 1–6 as including an engine (E/G) 11, an output shaft 12 extending along a first axis SH1 and outputting rotation generated by the engine 11 and planetary gearing 13 serving as a differential gear unit and arranged on the first axis SH1 for distributing torque inputted via the output shaft 12. An output shaft 14, serving as a connecting member, is also arranged on the first axis SH1 and receives rotation output from the planetary gear unit 13. A counter drive gear ("first gear") 15 is likewise arranged on the first axis and is fixed to the output shaft 14 on the engine side of the planetary gear unit 13. A generator-motor (G) 16 is also arranged on the first axis SH1 and is connected to the planetary gear unit 13 via a transmitting shaft 17. The output shaft 14 has a sleeve-like shape and is arranged surrounding the output shaft 12.

The planetary gear unit 13 comprises a sun gear S as a first element, a pinion P in mesh with the sun gear S, a ring gear R as a second element in mesh with the pinion P and a carrier CR as a third element rotatably supporting the pinion P. The sun gear S is connected to the generator-motor 16 via the transmitting shaft 17, the ring gear R is connected to the counter drive gear 15 via the output shaft 14 and the carrier CR is connected to the engine 11 via the output shaft 12.

The generator-motor 16 comprises a rotor 21 fixed to the transmitting shaft 17, a stator 22 arranged surrounding the rotor 21 and a coil 23 wound around the stator 22. The generator-motor 16 generates electric power from rotation input via the transmitting shaft 17. The coil 23 is connected to a battery, not illustrated, and supplies current to the battery.

A drive motor (M) 25 is arranged on a second axis SH2 in parallel with the first axis SH1 coaxial with the output shaft 12. Drive motor 25 is connected to the battery for generating rotation upon being supplied with current from the battery and has an output shaft 26 arranged extending along second axis SH2 for outputting its generated rotation. An output gear 27 ("second gear") is centered on the second axis SH2 and fixed to the output shaft 26. The drive motor 25 comprises a rotor 37 fixed to the output shaft 26, a stator 38 arranged surrounding the rotor 37 and a coil 39 wound around the stator 38.

A counter shaft 31 is arranged on a third axis SH3, in parallel with the first axis SH1 and the second axis SH2, for transmitting rotation to a drive wheel, not illustrated, in a direction the same as the rotation of the engine 11. A counter driven gear 32 ("third gear") is fixed to the counter shaft 31. The counter driven gear 32 is meshed with the counter drive gear 15 and with the output gear 27, so that rotation of the counter drive gear 15 is transmitted to the output gear 27 through the counter driven gear 32.

Further, the counter shaft 31 carries a pinion drive gear 33 ("fourth gear") fixed thereto and having a number of teeth smaller than that of the counter driven gear 32.

Figure 2:
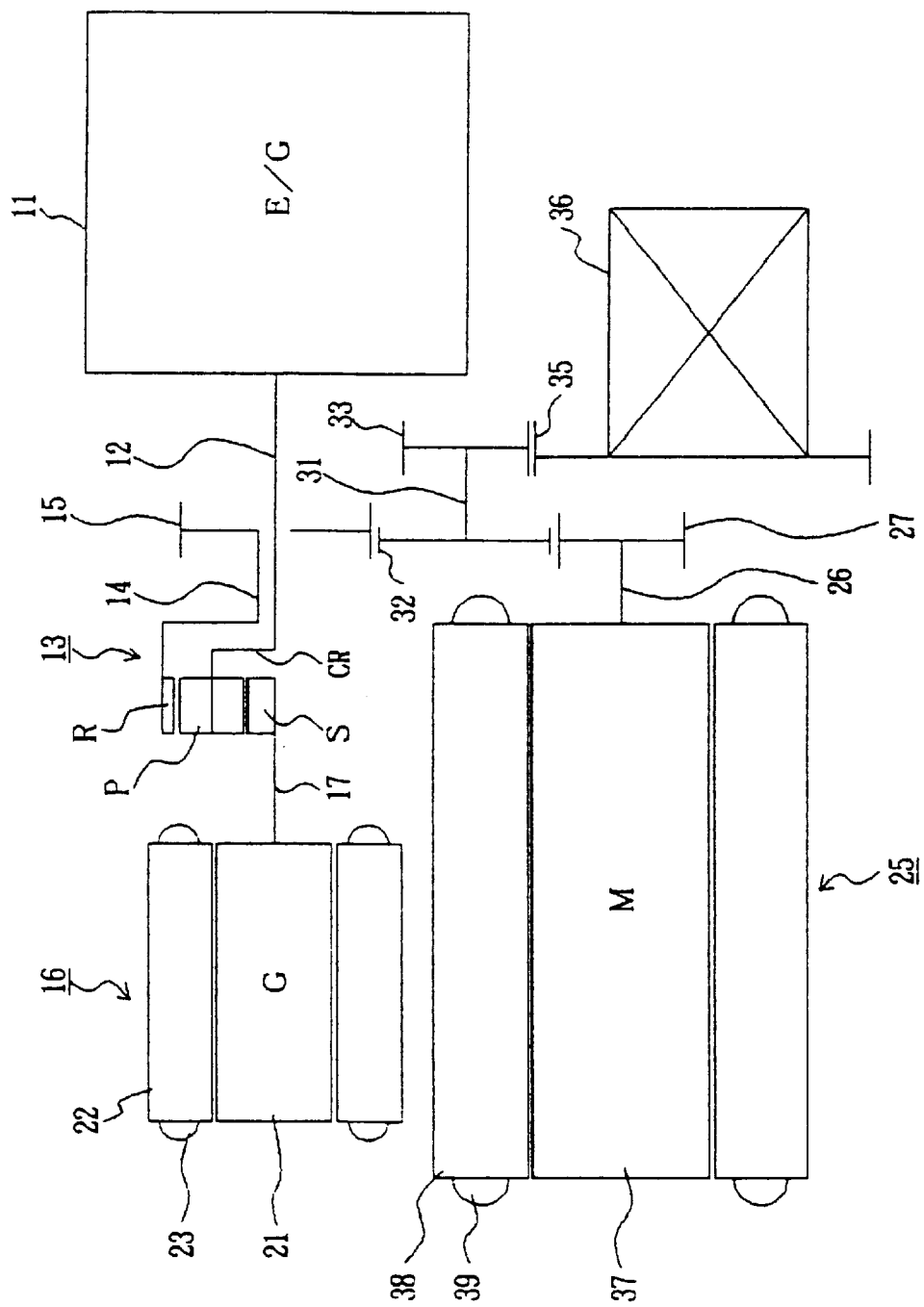
FIG. 2 is a schematic diagram of an engine and the drive unit according to the first embodiment of the invention.
Figure 3:
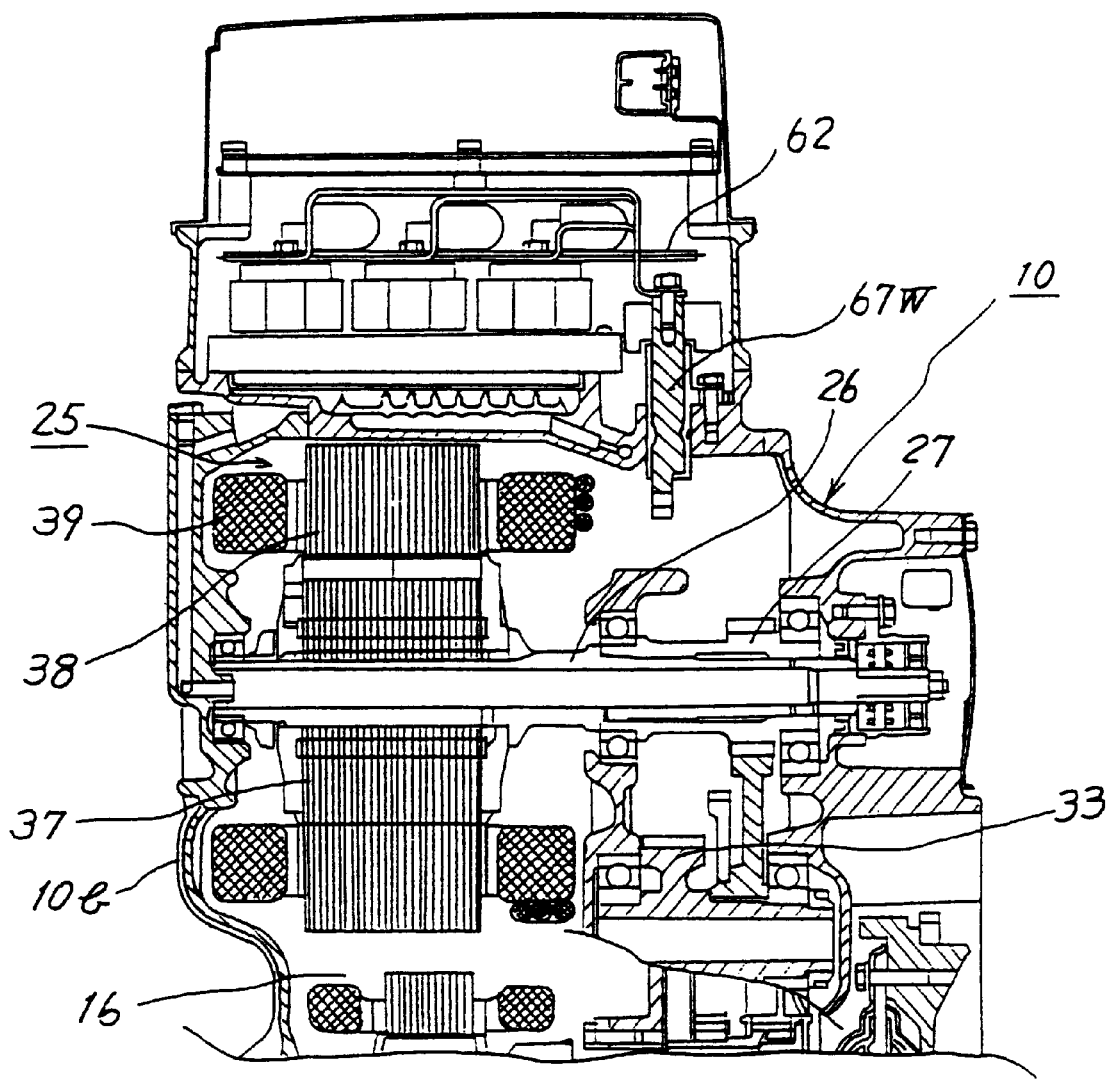
FIG. 3 is a first sectional view of the drive unit according to the first embodiment of the invention.
Figure 4:
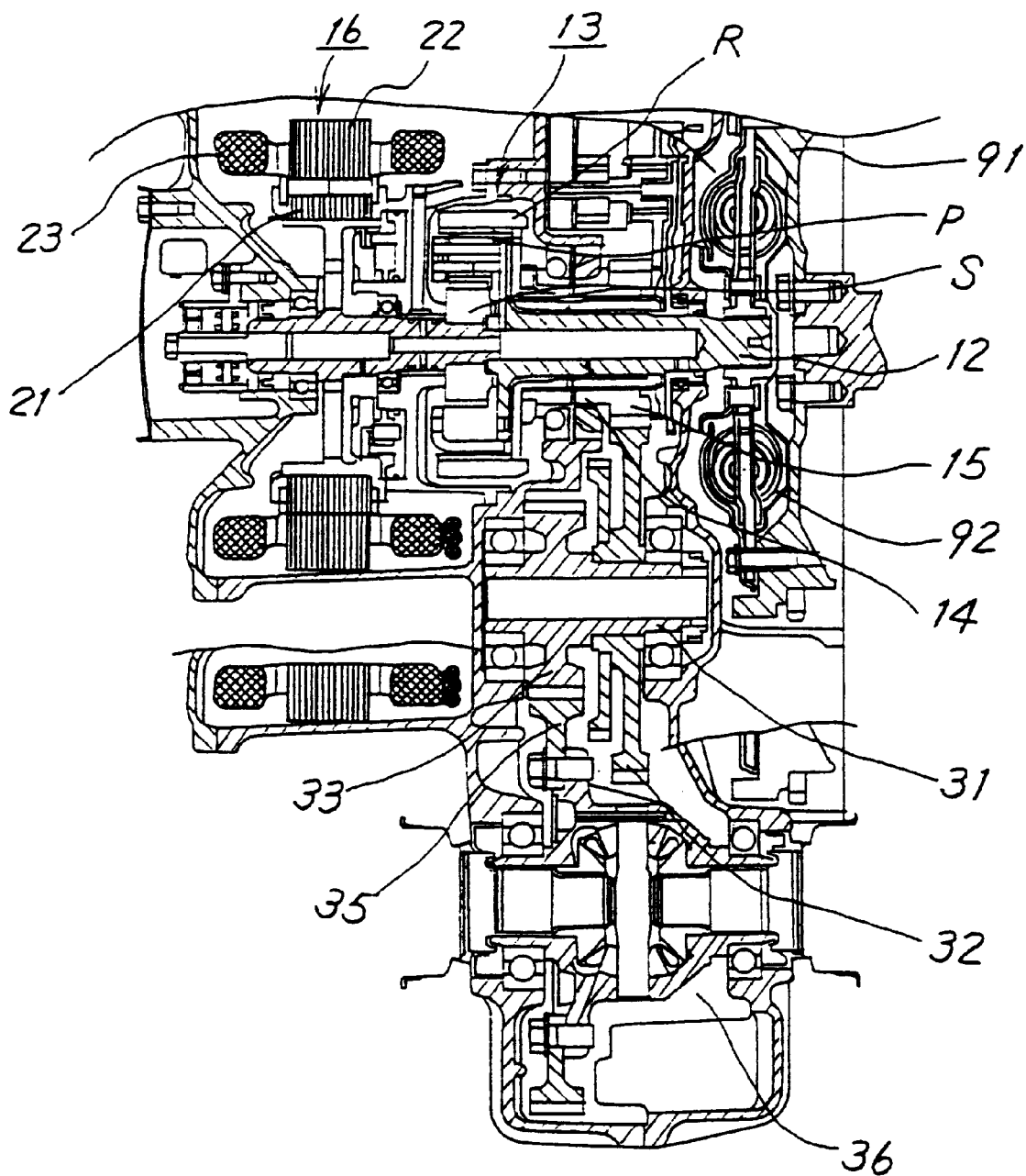
FIG. 4 is a second sectional view of the drive unit according to the first embodiment of the invention.
Figure 5:
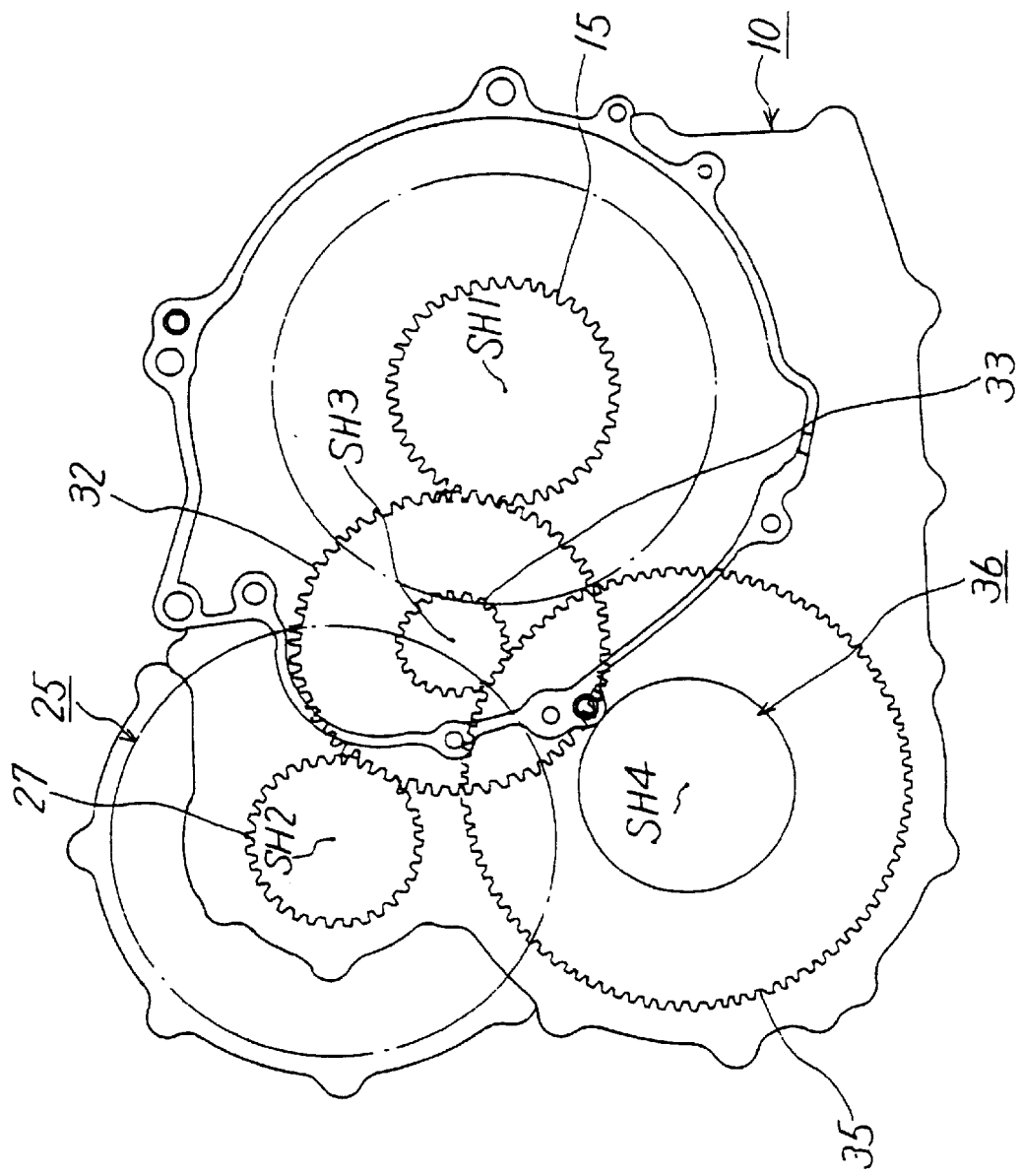
FIG. 5 is a third sectional view showing essential portions of the drive unit according to the first embodiment of the invention.

Further, a large ring gear 35 ("fifth gear")is arranged on a fourth axis SH4 in parallel with the first axis SH1, the second axis SH2 and the third axis SH3 and is in meshing engagement with the pinion drive gear 33. Further, the large ring gear 35 is fixed to differential unit 36 and rotation received by the large ring gear 35 is distributed by the differential apparatus 36 to the drive wheels. In FIGS. 2 and 4, positions of the counter driven gear 32 and the pinion drive gear 33 are respectively reversed for convenience of illustration.

Thus, the torque transmitting drive train includes the planetary gear unit 13, the generator-motor 16, the drive motor 25, the differential apparatus 36, other gears and the like. Further, as shown in FIG. 4, a flywheel 91 and a damper 92 are arranged between the engine 11 and the output shaft 12.

The generator-motor 16 and the drive motor 25 are arranged on respective axes which are in parallel with each other and, accordingly, the speed reduction ratio between the first axis SH1 and the second axis SH2 can freely be set. Accordingly, the degree of freedom of design of the torque transmitting drive train is expanded. As a result, the drive motor 25 and the generator-motor 16 can be driven under optimum conditions.

A metal casing 10 having excellent heat conductivity includes a chamber 10a for housing the drive motor 25 and the generator-motor 16.

The drive unit of the present invention may be considered as including the planetary gear unit 13, the generator-motor 16, the drive motor 25 and the differential unit 36, inverter 53 for the drive motor and an inverter 54 for the generator-motor, described later, and a heat sink, also described later.

A metal inverter case 46 (control unit case) is installed on a top wall 49 formed at an upper end portion of the casing 10. An inverter unit and control board containing chamber 60 is formed by the top wall 49 and the inverter case 46. An inverter unit 50 and control boards 57a and 57b are arranged in the chamber 60 and various electronic parts and so on are attached to the control boards 57a and 57b. Control unit 51 includes the control boards 57a and 57b, the electronic parts, etc.

The inverter unit 50 includes the inverter 53 for the drive motor, formed as a bridge circuit, the inverter 54 for the generator-motor, formed as another bridge circuit, and a smoothing condenser 55 shared in common by the inverter 53 and the inverter 54. Thus, a "first inverter" for operating the generator-motor 16 includes the inverter 53 for the drive motor and a "second inverter" for operating the drive motor 25 includes the inverter 54 for the generator-motor.

The smoothing condenser 55 is housed in chamber 10a with an end portion projecting therefrom and another portion thereof extending across a tangent "T" common to both the drive motor 25 and the generator-motor 16. The condenser 55 smooths the voltage of a power source, not illustrated, to thereby stabilize the voltage generated when transistors, i.e., switching elements of. respective bridge circuits in the inverters 53 and 54, are switched ON and OFF. Further, the inverter 53 for the drive motor and the inverter 54 for the generator-motor are arranged separate from but contiguous to each other and are attached to the drive unit case 10 and disposed radially outward of the drive motor 25 and the generator-motor 16. That is, the inverters 53 and 54 are arranged in a common plane in parallel with tangents of the drive motor 25 and the generator-motor 16. Accordingly, the axial dimension of the driving unit can be reduced and, therefore, mountability of the driving apparatus in a hybrid type vehicle, in which the transverse dimension is restricted, particularly a hybrid type vehicle of FF. (front drive and front axle) type, is enhanced.

A heat sink for radiating heat hermetically closes an opening of the drive unit casing 10. The heat sink is formed as a portion of the partition wall between the drive unit casing and the inverter case 46.

The inverter unit 50 is mounted above the heat sink and is attached to the cover 61 functioning as the attaching member and, accordingly, the inverter apparatus 50 can be integrated into the drive unit casing 10 as a sub-assembly. Accordingly, this design enables separate assembly of the inverter unit 50 as an integral unit and also enables testing of the inverter unit 50 for proper operation before installation on the drive unit casing 10.

Further, a portion of the partition wall is formed by the top wall 49 and accordingly, there is no need for an additional, separate wall member for partitioning the drive motor and generator-motor containing chamber 10a from the inverter and control board containing chamber 60, which feature furthers the objective of a light-weight design.

By use of the inverter 53 with the drive motor 25, the direct current supplied from the battery can be converted into three phase alternating current which can be supplied to the drive motor 25 and by use of the inverter 54 with the generator-motor 16, three phase alternating current supplied from the generator-motor 16 can be converted into direct current and the direct current can be supplied to the battery.

By making the partition wall and the heat sink coplanar and commonly used by both the inverter 53 and the inverter 54, compactness of the drive unit as a whole is enhanced.

Compactness is also enhanced by integration of the inverter 53 and the inverter 54 into the inverter unit 50 and by integration of the inverter unit 50, the drive motor 25 and the generator-motor 16, i.e., there is no need to separately connect the inverter 53 to the drive motor 25 and the inverter 54 to the generator-motor 16.

A groove is formed at an upper face of the top wall 49 and a fluid flow path 56 is formed by the groove and the cover 61. The cover 61 is formed of a metal having excellent heat conductivity. Further, the flow path 56 is connected to a radiator, not illustrated, for flow of cooling water therethrough. Cooling water at a temperature elevated by receiving heat from the top wall 49 is delivered to the radiator and is cooled in the radiator. Accordingly, the inverter unit 50 and the control unit 51 are directly cooled and the drive unit casing 10 is also cooled. Cooling oil circulated through the chamber 10a also serves to cool the drive motor 25 and the generator-motor 16. Because the cooling water flowing in the flow path 56 serves to cool both the inverted 53 and the inverter 54 flow path 56 can be simplified and the drive unit made more compact. Further, by cooling the drive unit casing 10, the oil circulated in the chamber 10a can be cooled and, accordingly, there is no need for a separate oil cooler and the oil circulation path can be simplified.

The stator 22 of the generator-motor 16 is supported by two pins 85, both ends of which are fixed to the drive unit casing 10 and a space 86 is formed between an outer peripheral face 22a of the stator 22 and the drive unit casing 10. Similarly, the stator 38 of the drive motor 25 is supported by two pins 87, both ends of which are fixed to the drive unit casing 10 and a space 88 is formed between an outer peripheral face 38a of the stator 38 and the drive unit casing 10. Accordingly, by supplying oil to the spaces 86 and 88, the generator-motor 16 and the drive motor 25 can be cooled.

Further, a recess or pocket 49a is formed at a substantially central portion of the top wall 49, extending toward the generator-motor 16, for containing the smoothing condenser 55 and a hole 61a is formed at a substantially central portion of the cover 65 to accommodate the smoothing condenser 55 in correspondence with the upper opening of the recess 49a. In this way, the smoothing condenser 55 is contained in the recess portion 49a, with one end projecting from the top wall 49 on one side of the tangential line "T" common to the generator-motor 16 and the drive motor 25 and its other end extending toward the generator-motor 16, with a portion thereof disposed on the other (inner) side of the tangential line "T". As seen in FIG. 1 the bottom of recess 49a lies in a plane extending approximately through the center of drive motor 26, i.e., approximately radially aligned therewith. Accordingly, dead space in the chamber 10a is reduced, further contributing to overall compactness of the drive unit.

Figure 6:
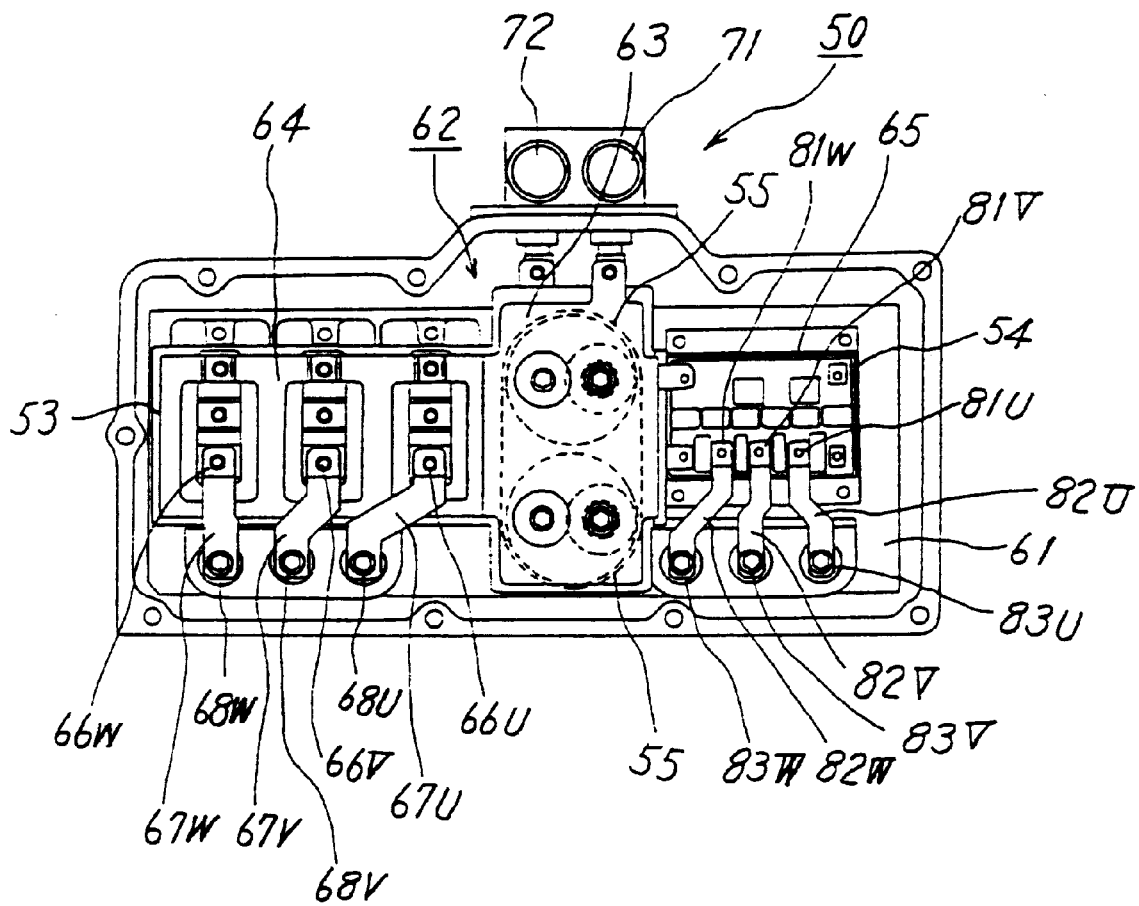
FIG. 6 is a plan view of an inverter unit according to the first embodiment of the invention.

As best seen in FIG. 6, a main wiring board 62 is arranged above the inverter 53 for the drive motor, the inverter 54 for the generator-motor and the smoothing condenser 55 and is spaced therefrom by a predetermined interval. The main wiring board 62 includes a common wiring board portion 63 for connecting the smoothing condenser 55 and the battery via terminals 71 and 72, a wiring board portion 64 for the motor disposed above the inverter 53 for connecting the wiring board portion 63 and the inverter 53, and a wiring board portion 65 for the generator disposed above the inverter 54 for connecting the wiring board portion 63 and the inverter 54.

The main wiring board 62 is substantially planar and, accordingly, the L components (wires—see FIG. 1) can be shortened. Further, the drive motor 25 and the generator-motor 16 are connected via the smoothing condenser 55 and, accordingly, transfer of electric power between the drive motor 25 and the generator-motor 16 can be smoothed.

Output bus bars 67U, 67V and 67W are connected between output terminals 66U, 66V and 66W of the inverter 53 for the drive motor and terminals 68U, 68V and 68W of the drive motor 25 and input bus bars 82U, 82V and 82W are connected between input terminals 81U, 81V and 81W of the inverter 54 for the generator-motor and terminals 83U, 83V and 83W of the generator-motor 16. The inverter 53 is connected by first lead wires $L_{MU}$, $L_{MV}$ and $L_{MV}$ to terminals 68U, 68V and 68W, respectively, of the drive motor 25. The inverter 54 is connected by second lead wires $L_{GU}$, $L_{GV}$ and $L_{GW}$ to the terminals 83U, 83V and 83W, respectively, of the generator20 motor 16.

The first and the second lead wires $L_{MU}$, $L_{MV}$, $L_{MW}$, $L_{GU}$, $L_{GV}$ and $L_{GW}$ connect at the axial ends of each of the drive motor 25 and the generator-motor 16 which face the side of the drive unit casing 10 where the engine 11 attaches.

Further, the outer diameter of the output gear 27 is much smaller than the outer diameter of the drive motor 25, thus creating a dead space in the chamber 10a due to the difference between these diameters. Thus, the gear train for transmitting power of the drive motor 25 to the differential apparatus 36 includes the output gear 27, the counter driven gear 32, the pinion drive gear 33 and the large ring gear 35 and the dead space extends along an outer side along the axial length of the gear train. The dead space is effectively utilized for the output bus bars 67U, 67V and 67W and the terminals 83U, 83V and 83W.

Accordingly, the operations of connecting the first lead wires $L_{MU}$, $L_{MV}$ and $L_{MW}$ with the terminals 68U, 68V and 68W and connecting the second lead wires $L_{GU}$, $L_{GV}$ and $L_{GW}$ with the terminals 83U, 83V and 83W, can be carried out from the same side and these operations are thereby simplified. As a result, integrating performance of the drive motor 25 and the generator-motor 16 is facilitated. Further, the first and the second lead wires $L_{MU}$, $L_{MV}$, $L_{MW}$, $L_{GU}$, $L_{GV}$ and $L_{GW}$ are taken out from the engine attaching face and connected to the output bus bars 67U, 67V and 67W and terminals 83U, 83V and 83W in the dead space and, accordingly, the dead space within chamber 10a is utilized and the drive unit can be made more compact. Further, because none of the first and the second lead wires $L_{MU}$, $L_{MV}$, $L_{MW}$, $L_{GU}$, $L_{GV}$ and $L_{GW}$ are taken out from the side of the rear cover 10b of the drive unit casing 10, the rear cover 10b can be formed flat, without any projection. Accordingly, when the drive unit is mounted in a hybrid type vehicle, a side member of the hybrid type vehicle and the rear cover 10b do not interfere with each other.

Further, by generating a pulse width modulating signal with a base drive circuit for the drive motor, not illustrated, and utilizing the pulse width modulating signal to switch the respective transistors of respective circuits of the inverter 53 for the drive motor, direct current supplied from the battery via the smoothing condenser 55 is converted into alternating current between emitters and collectors of the respective transistors and the three phase alternating current is output from the respective output terminals 66U, 66V and 66W to the output bus bars 67U, 67V and 67W. In this manner, the drive motor 25 outputs the power for rotation of the drive wheels to run the hybrid vehicle.

Further, by generating a pulse width modulating signal with the base drive circuit of the control apparatus 51 and inputting the pulsed width modulating signal to respective transistors of respective bridge circuits of the inverter 54 for the generator-motor, alternating current generated by the generator-motor 16 is input to the respective input terminals 81U, 81V and 81W via the input bus bars 82U, 82V and 82W and is converted into direct current between emitters and collectors.

The top wall 49 is inclined such that it is higher on the side of the drive motor 25 and is lower on the side of the generator-motor 16, that is, the front side (right side in FIG. 1) in relation to the hybrid vehicle is the lower side. The inverter 53 for the drive motor is arranged above the drive motor 25 and the inverter 54 for the generator-motor is arranged above the generator-motor 16, respectively. Further, the respective transistors of the respective bridge circuits of the inverter 53 for the drive motor and the drive motor 25 are connected by the output bus bars 67U, 67V and 67W and the respective transistors of the respective bridge circuits of the inverter 54 for the generator-motor and the generator-motor 16 are connected by the input bus bars 82U, 82V and 82W, respectively. Accordingly, the output bus bars 67U, 67V and 67W and the input bus bars 82U, 82V and 82W can be shortened and, therefore, wiring can be simplified, and the cost of the drive unit and power consumption can be reduced. Further, the drive unit is thereby made more light-weight.

As previously mentioned, the inverter 53 for the drive motor and the inverter 54 for the generator-motor are arranged contiguous to each other. Further, the inverter 53 for the drive motor and the inverter 54 for the generator-motor are attached to the drive unit casing 10 at positions in which the sum of lengths of the first lead wires $L_{MU}$, $L_{MV}$ and $L_{MW}$ when connected to the inverter 53 and the lengths of the second lead wires $L_{GU}$, $L_{GV}$ and $L_{GW}$ when connected to the inverter 54 is less than the sum of lengths of the first lead wires $L_{MU}$, $L_{MV}$ and $L_{MW}$ when connected with the inverter 54 and the second lead wires $L_{GU}$, $L_{GV}$ and $L_{GW}$ when connected with the inverter 53.

Thus, the lengths of the first lead wires $L_{MU}$, $L_{MV}$ and $L_{MW}$ are equal to the distances between their connections at an end of the stator coil 39 and the terminals 68U, 68V and 68W. Likewise, the lengths of the second lead wires $L_{GU}$, $L_{GV}$ and $L_{GW}$ are equal to the distances between their connections at an end of the stator coil 23 and the terminals 83U, 83V and 83W.

In this way, the inverters 53 and 54 are arranged so as to minimize the lead wire length and, accordingly, the wiring can be simplified, the cost of the drive unit can be reduced and the power consumption can be reduced. Further, the drive unit can be made more light-weight.

Further, the drive unit casing 10 and the inverter case 46 are formed of metal and thereby provide a housing which is an electromagnetic shield. Accordingly, in operation of the inverters 53 and 54, even when electromagnetic radiation is generated inside the housing, it does not leak from the drive unit casing 10. Further, the first and the second lead wires LMU, LMV, LMW, LGU, LGV and LGW are all electromagnetically shielded lines and, accordingly, even when three-phased alternating current flows therethrough no electromagnetic radiation is generated. As a result, hazards such as influence of electromagnetic radiation on the engine control unit, on the automatic transmission control unit, and on accessory devices is prevented.

With the drive motor 25 and the generator-motor 16 housed within chamber 10a and the inverters 53 and 54 arranged so as to minimize the lead wire length, the first and the second lead wires need not be exposed to the exterior of the drive unit casing 10. Therefore, even when a small amount of electromagnetic radiation is is generated by the current flow through the first and second lead wires LMU, LMV, LMW, LGU, LGV and LGW, that electromagnetic radiation is prevented from leaking to the outside of the drive unit casing 10.

Further, although the first inverter has been described as the inverter 53 for the drive motor and the second inverter has been described as the inverter 54 for the generator-motor, the first inverter may be the inverter for the generator-motor and the second inverter may be the inverter for the drive motor.

Further, since the top wall 49 is inclined, the inverter case 46 is also inclined in correspondence with the top wall 49. Therefore, when the drive unit is installed with the generator-motor 16 disposed on the front side (right side in FIG. 1) and the drive motor 25 disposed on the rear side (left side of FIG. 1), in conformity with inclination of the engine hood (bonnet) of the hybrid type vehicle, available space in the engine compartment may be utilized to the fullest. As a result, the drive unit and vehicle can be made more compact.

Further the inverter unit 50 can also be inclined in correspondence with the top wall 49 and, accordingly, the gravitational center of the driving apparatus can be lowered, thereby stabilizing the drive unit. Further, the inverter unit 50 and the output shaft 12 can be located adjacent to each other so that the moment of inertia centered on the output shaft 12 can be reduced. As a result, the vibration of the drive unit can be better isolated.

Further, because the fluid flow path 56 extends from a front side of the hybrid type vehicle which is lower to a rear side thereof (left side in FIG. 1) which is higher, when cooling water flows from the front side of the hybrid type vehicle (right side in FIG. 1) toward the rear side (left side in FIG. 1), air within the fluid flow path 56 can be delivered to the rear side along with the flow of the cooling water. Accordingly, air bleeding of the fluid flow path 56 can be easily carried out merely by forming an air bleeding hole at the rear end (left end in FIG. 1) of the fluid flow path 56. Further, there is no need for any other air bleeding structure.

Figure 7:
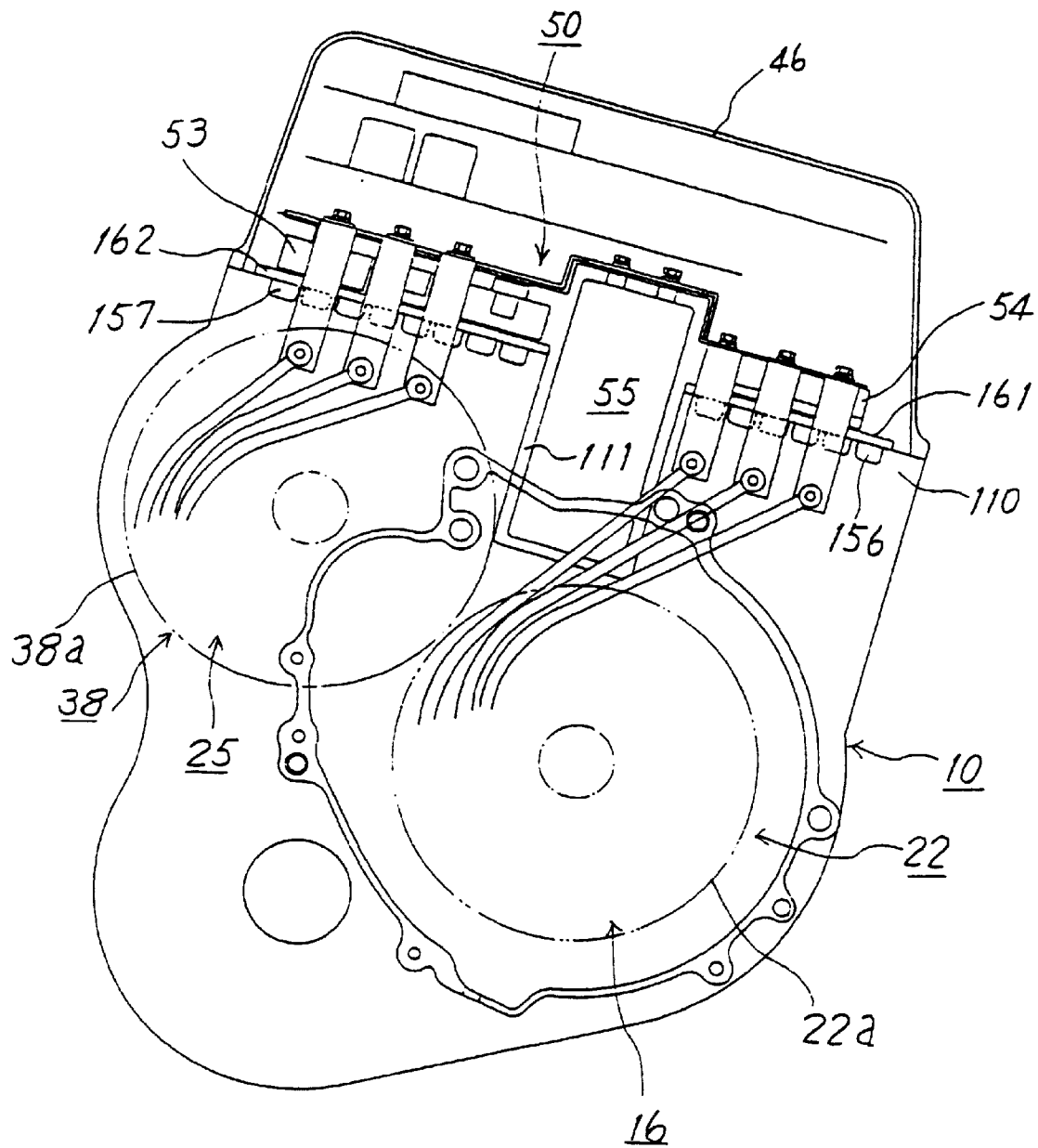
FIG. 7 is a sectional view of a drive unit according to a second embodiment of the invention.
Figure 8:
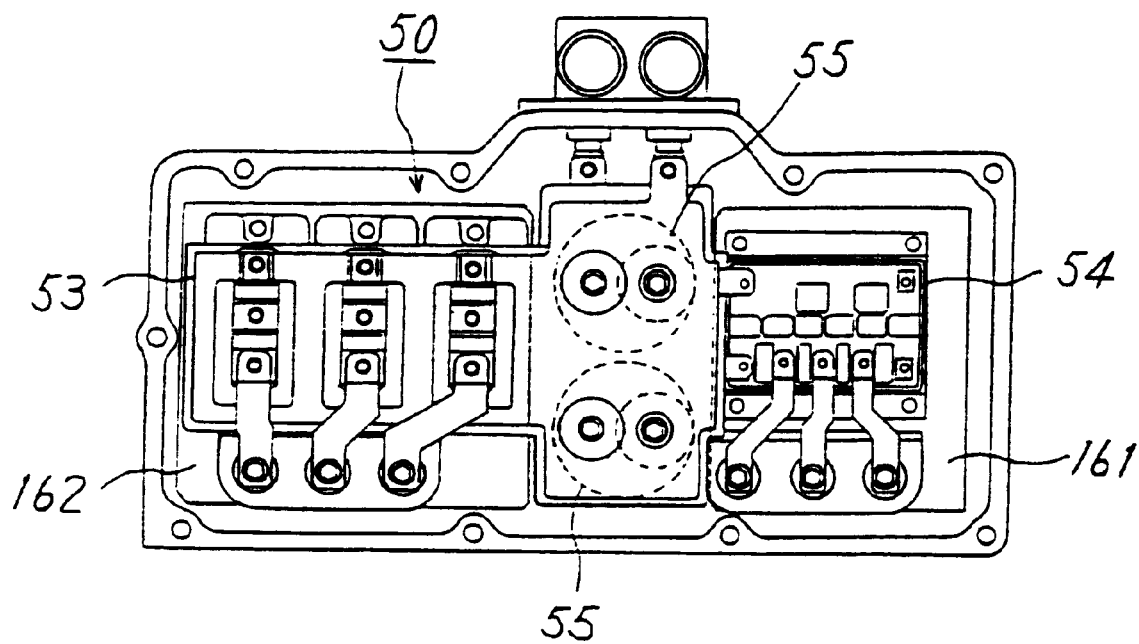
FIG. 8 is a plan view of an inverter unit according to the second embodiment of the invention.

Next, a second embodiment of the invention will be described with reference to FIGS. 7 and 8. Portions having structure the same as in the first embodiment are designated by the same reference numerals and explanation thereof is omitted.

In this second embodiment, both ends of the stator 22 of the generator-motor 16 are fixed to the drive unit case 10 by shrink fitting and no space remains between the outer peripheral face 22a of the stator 22 and the drive unit casing 10. Similarly, both ends of the stator 38 of the drive motor 25 are fixed to the drive unit casing 10 by shrink fitting and no space is provided between the outer peripheral face 38a of the stator 38 and the drive unit casing 10.

Further, a bottomed recess portion 111 for receiving the smoothing condenser 55 with an end portion thereof extends toward the generator-motor 16 from a substantially central position at an upper end portion 110 of the drive unit casing 10. As in the first embodiment, a portion of the smoothing condenser 55 is disposed on the inner side of a line tangential to both the drive motor 25 and the generator-motor 16. Further, an upper face of the upper end portion 110 is formed with a groove contiguous to the recess portion 111 and by covering the groove with covers 161 and 162, fluid flow paths 156 and 157 are formed. The covers 161 and 162 are formed of a metal having excellent heat conductivity.

A heat sink for radiating heat and for hermetically closing the opening of the drive unit casing 10 is constituted by the upper end portion 110, the covers 161 and 162 and a portion of the partition wall arranged between the drive unit casing 10 and the inverter casing 46. Accordingly, not only the inverter unit 50 can be cooled by cooling water flowing in the fluid flow paths 156 and 157 but also the generator-motor 16 and the drive motor 25 can be cooled via the drive unit casing 10. Further, although in this second embodiment, the fluid flow paths 156 and 157 are connected by a communicating flow path (not illustrated) through which the same cooling water flows, the respective fluid flow paths can be formed independently from each other and the cooling water flows can be separate from each other.

Figure 9:
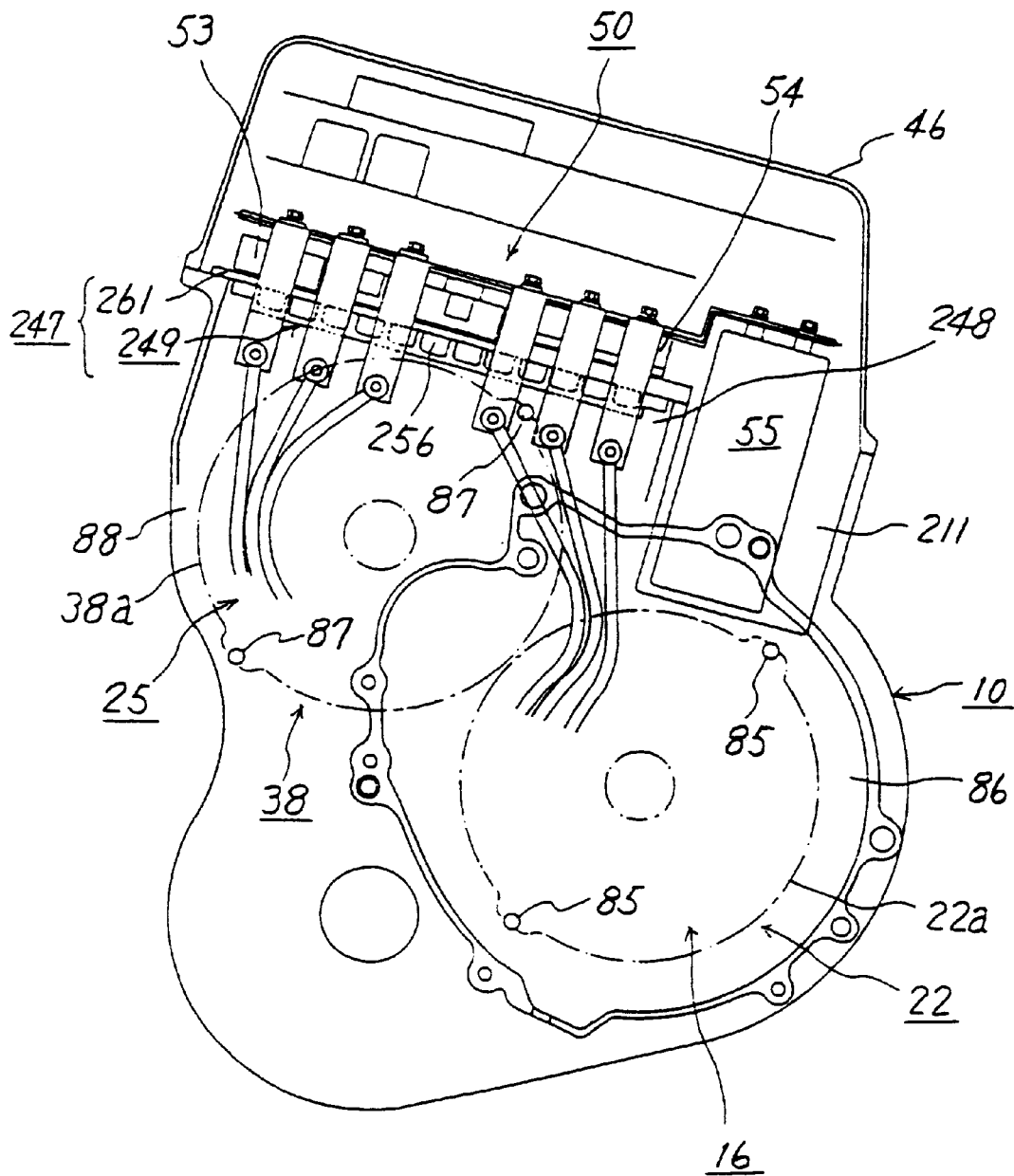
FIG. 9 is a sectional view of a drive unit according to a third embodiment of the invention.
Figure 10:
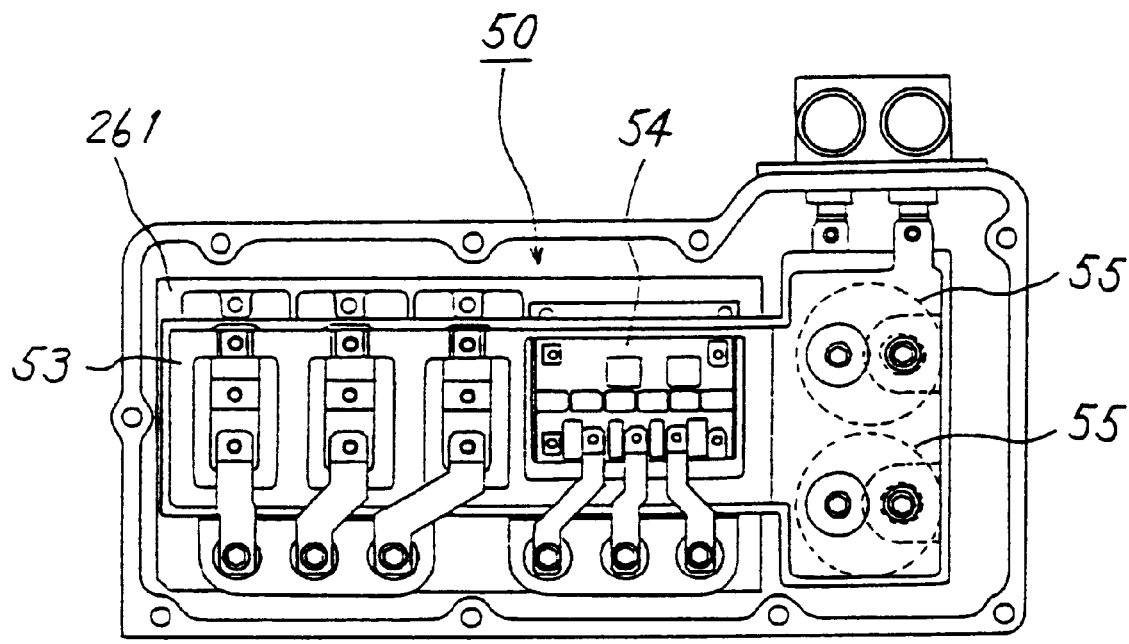
FIG. 10 is a plan view of an inverter unit according to the third embodiment of the invention.

A third embodiment of the invention will now be described with reference to FIGS. 9 and 10. Again, portions having the same structures as those in the first embodiment are designated by the same reference numerals and explanation thereof is omitted.

In this third embodiment, the upper face of the drive unit casing 10 is formed with a bottomed recess 211 for holding the smoothing condenser 55 at the front end (right end portion in FIG. 7) and has an end portion which extends across the common tangent toward the generator-motor 16. A portion of the smoothing condenser 55 is disposed on inner side of a tangential line common to the drive motor 25 and the generator-motor 16. Further an opening 248 is formed in a central portion of the upper face of the drive unit casing 10, the opening 248 extending to the rear end portion (left end portion in FIG. 7) of the casing 10, and a heat sink 247 for radiating heat is attached to cover the opening 248. The heat sink 247 includes a fluid flow path block 249 in the shape of a flat plate and a cover 261 and hermetically closes the drive unit casing 10. A portion of the partition wall is arranged between the drive unit casing 10 and the inverter casing 46. The control unit casing is formed by the front end portion with the recess 211 and the heat sink 247. Further, a groove is formed in the fluid flow path block 249 and, by covering the groove with the cover 261, the fluid flow path 256 is formed. The cover 261 is also formed of a metal having excellent heat conductivity.

Figure 11:
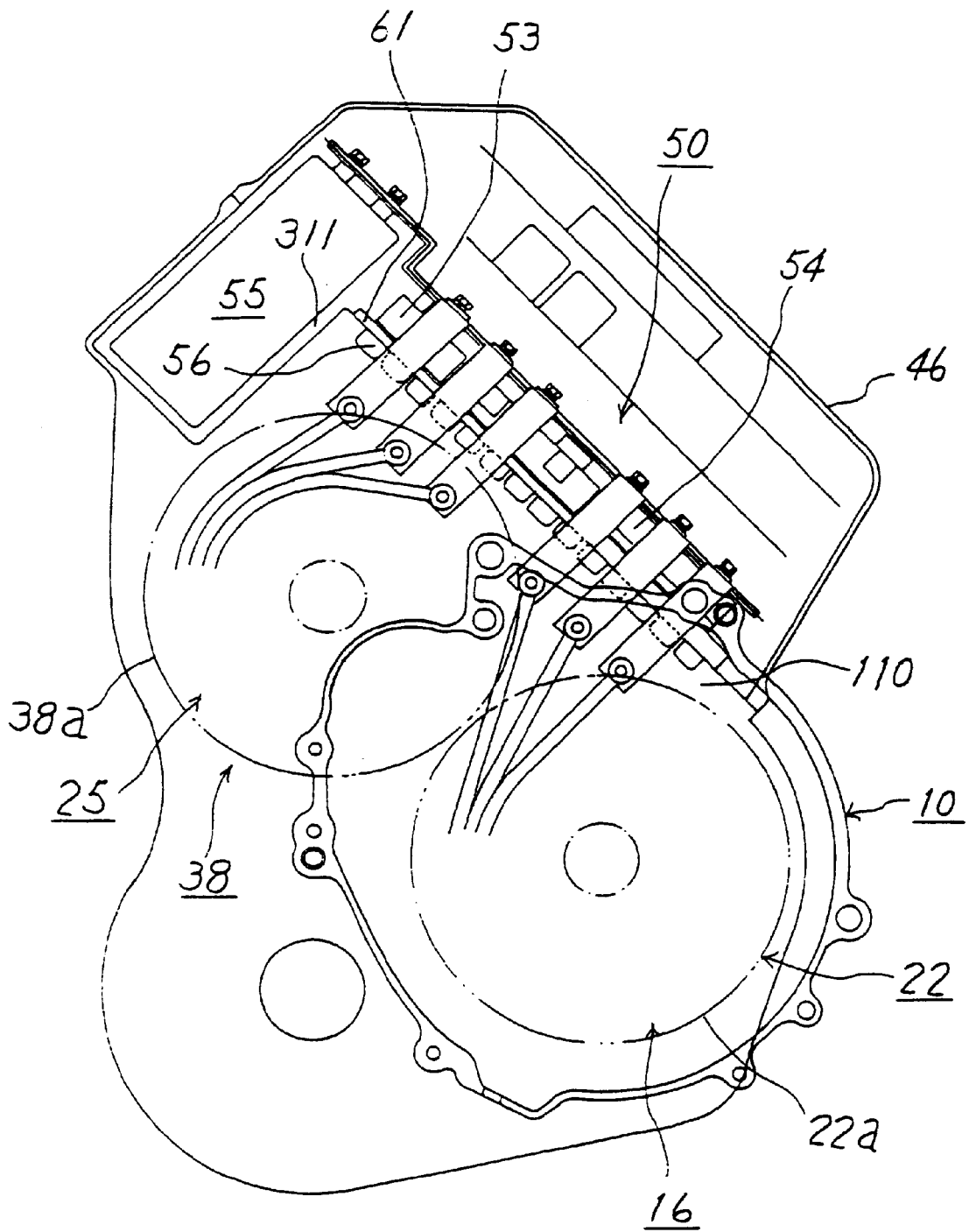
FIG. 11 is a sectional view of a drive unit according to a fourth embodiment of the invention.
Figure 12:
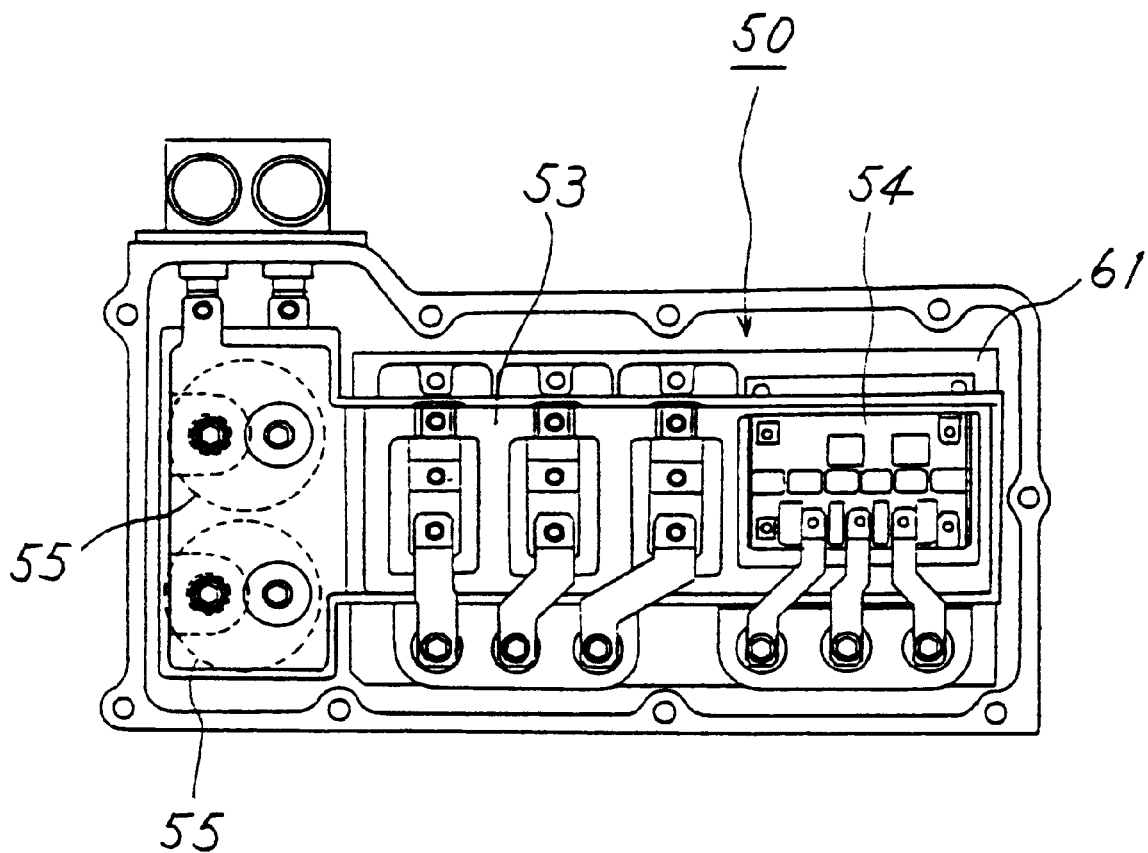
FIG. 12 is a plan view of an inverter unit according to the fourth embodiment of the invention.

A fourth embodiment of the invention will now be described with reference to FIGS. 11 and 12. Again, portions having the same structures as those in the first embodiment are designated by the same reference numerals and explanation thereof is omitted.

In this fourth embodiment, both ends of the stator 22 of the generator-motor 16 are fixed to the drive unit casing 10 by shrink fitting and no space is formed between the outer peripheral face 22a of the stator 22 and the drive unit casing 10. Similarly, both ends of the stator 38 of the drive motor 25 are fixed to the drive unit casing 10, also by shrink fitting, and no space is formed between the outer peripheral face 38a of the stator 38 and the drive unit casing 10.

A bottomed recess 311 for containing the smoothing condenser 55 is formed at the rear end portion (left end portion in FIG. 9) of the upper end portion 110 of the drive unit casing 10 with an end portion thereof projecting therefrom. Further, a groove is formed at the upper face of the upper end portion 110 and, by covering the groove with the cover 61, a fluid flow path 56 is formed. The cover 61 is likewise formed of a metal having excellent heat conductivity. Further, a heat sink for radiating heat and for hermetically closing the opening of the drive unit casing 10 is constituted by the upper end portion 110, the cover 61 and a portion of the partition wall between the drive unit casing 10 and the inverter casing 46.

Figure 13:
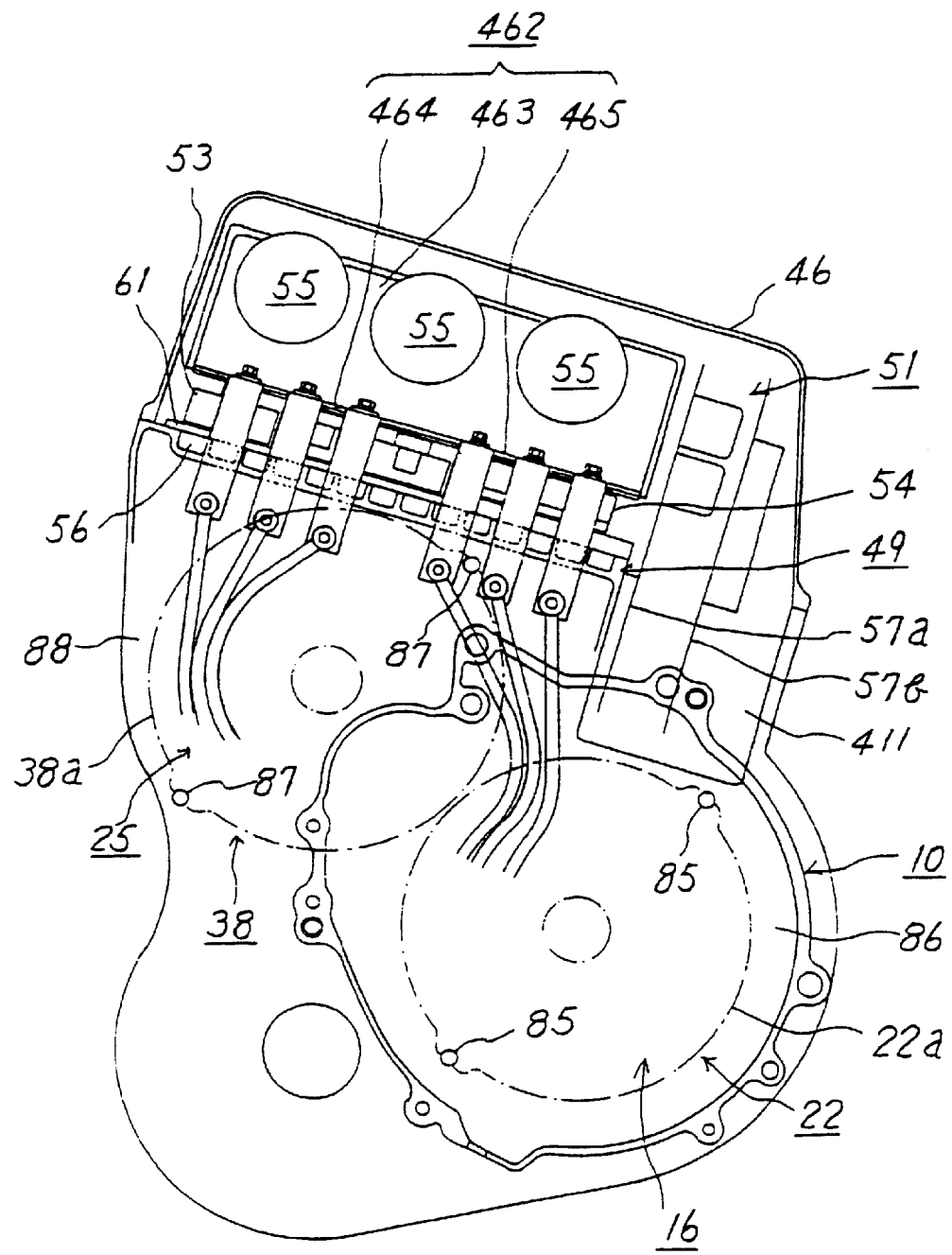
FIG. 13 is a sectional view of a drive unit according to a fifth embodiment of the invention.
Figure 14:
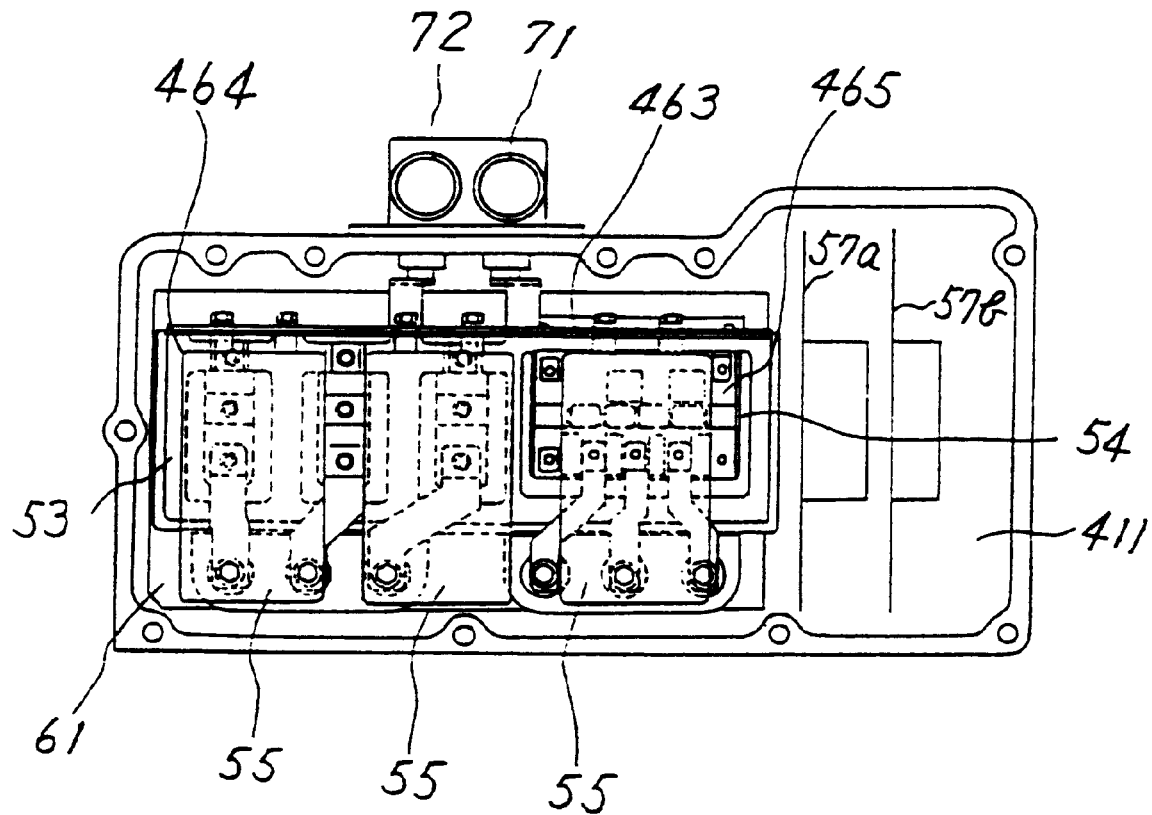
FIG. 14 is a plan view of an inverter unit according to the fifth embodiment of the invention.

A fifth embodiment of the invention will now be described with reference to FIGS. 13 and 14. Again, portions having the same structures as those in the first embodiment are designated by the same reference numerals and explanation thereof will be omitted.

In this fifth embodiment, a bottomed recess 411 for containing the control apparatus 51 is formed at the front end portion (right end portion in FIG. 11) of the drive unit casing 10. Further, a groove is formed extending from a central portion of the top wall 49 of the drive unit casing 10 to the rear end portion (left end portion in FIG. 11) and, by covering the groove with the cover 61, the fluid flow path 56 is formed. As in the previously described embodiments, the cover 61 is formed of a metal having excellent heat conductivity. Further, a heat sink for radiating heat is constituted by the top wall 49 and the cover 61 and a portion of the partition wall between the drive unit casing 10 and the inverter casing 46. The control boards 57a and 57b of the control unit 51 are installed substantially vertically inside the recess 411.

A main wiring board 462 is installed above the inverter 53 for the drive motor (first inverter) and the inverter 54 for the generator-motor (second inverter) is spaced apart therefrom by a predetermined distance. The main wiring board 462 includes a common wiring board portion 463 extending in the vertical direction for connecting the smoothing condenser 55 with a battery, not illustrated, via the terminals 71 and 72, a wiring board portion 464 disposed above the inverter 53 for connecting the wiring board portion 463 with the inverter 53 and a wiring board portion 465 disposed above the inverter 54, for connecting the wiring board portion 463 with the inverter 54. The smoothing condenser 55 is attached to the wiring board portion 463 above the wiring board portions 464 and 465.

Figure 15:
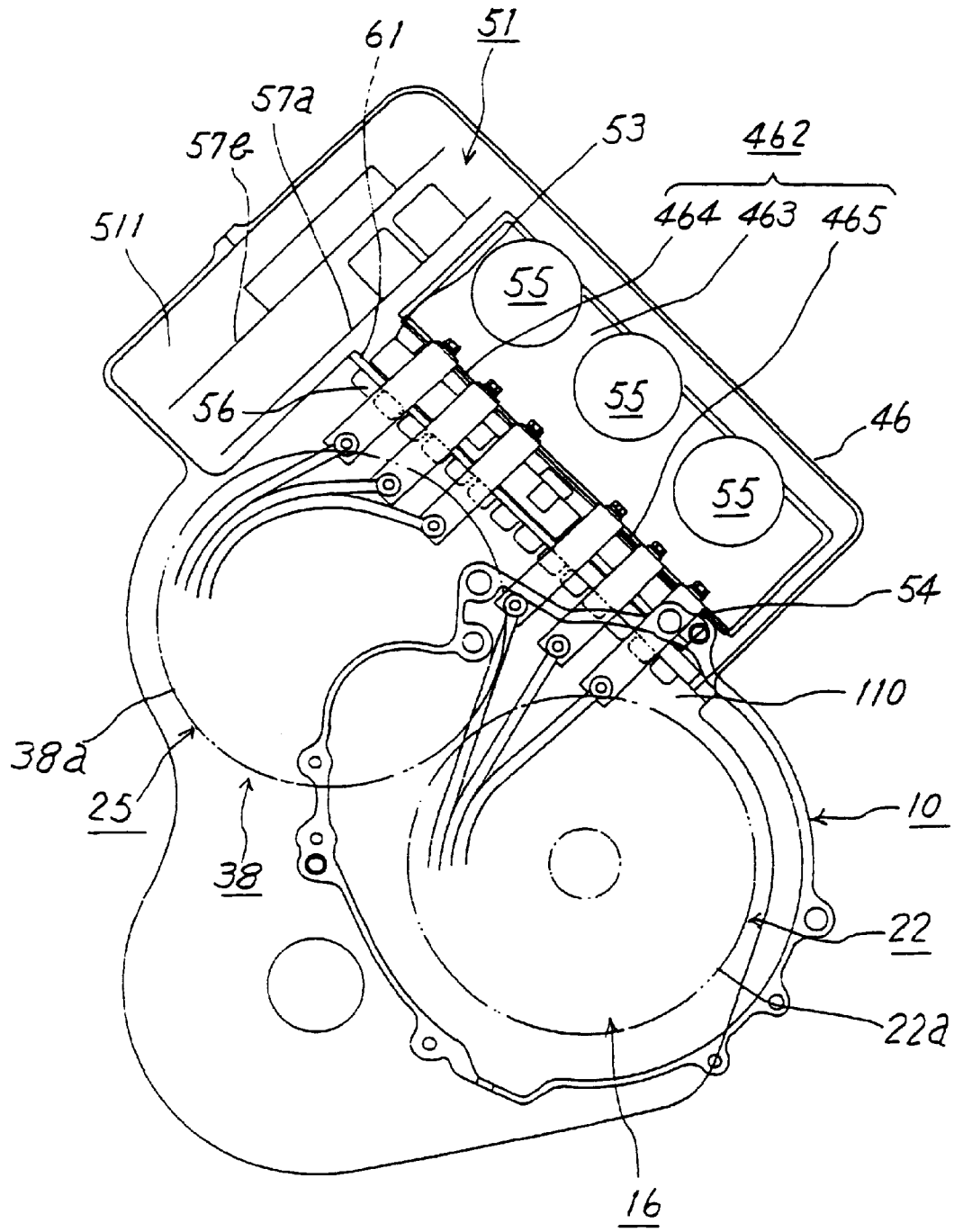
FIG. 15 is a sectional view of a drive unit according to a sixth embodiment of the invention.
Figure 16:
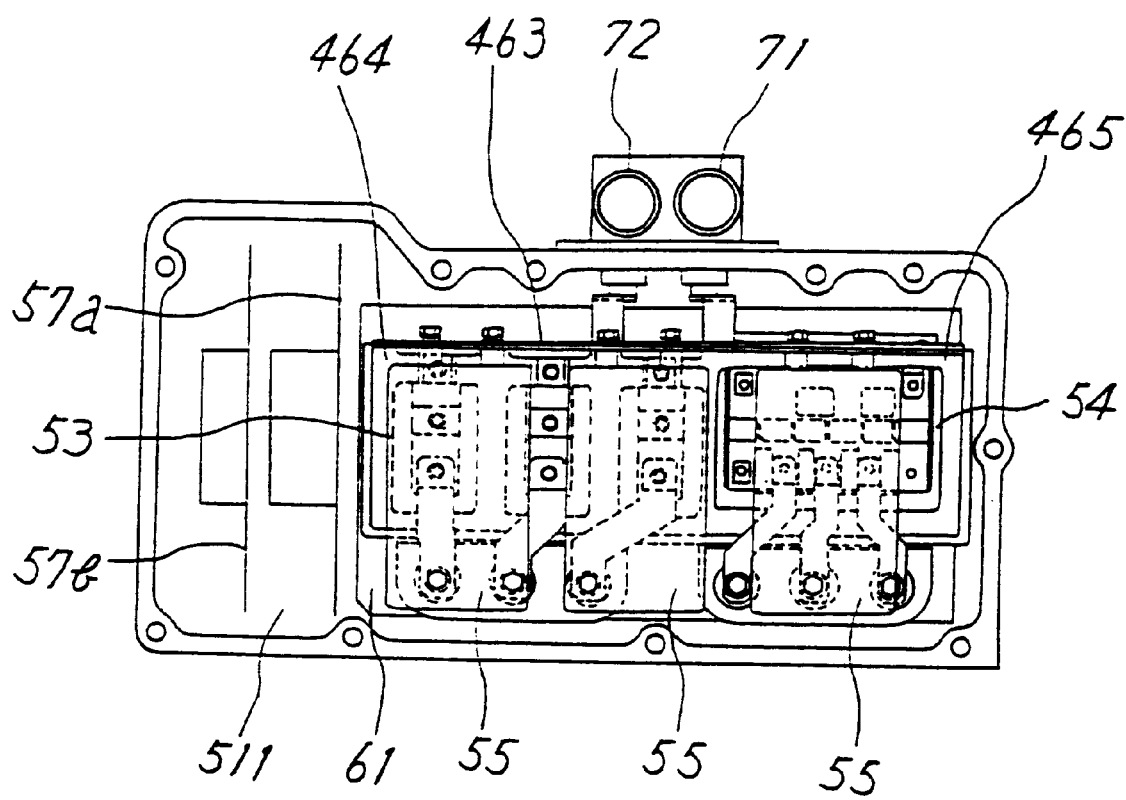
FIG. 16 is a plan view of an inverter unit according to the sixth embodiment of the invention.

A sixth embodiment of the invention will now be described with reference to FIGS. 15 and 16. Once again, portions having the same structures as those in the first embodiment are designated with the same reference numerals and explanation thereof will be omitted.

In this sixth embodiment, a bottomed recess 511 for containing the control unit 51 is formed at the rear end portion (left side in FIG. 13) of the drive unit casing 10. Further, a groove is formed extending from a central portion of the upper end portion 110 of the drive unit casing 10 to the front end portion (right end in FIG. 13) and, by covering the groove with the cover 61, the fluid flow path 56 is formed. As in the other embodiments, the cover 61 is formed of a metal having excellent heat conductivity. Further, a heat sink for radiating heat and for hermetically closing the opening of the drive unit casing 10 is constituted by the upper end portion 110, the cover 61, and the portion of the partition wall between the drive unit casing 10 and the inverter casing 46. The control boards 57a and 57b of the control unit 51 are installed inclined within the recess 51.

The wiring board 462 is arranged above the inverter 53 for the drive motor (first inverter) and the inverter 54 for the generator-motor (second inverter) and is spaced apart therefrom by a predetermined distance. The main wiring board 462 includes the common wiring board portion 463 which is vertically oriented for connecting the smoothing condenser 55 and a battery, (not illustrated) via the terminals 71 and 72, the wiring board portion 464 for the motor disposed above the inverter 53 for connecting the wiring board portion 463 with the inverter 53 and the wiring board portion 465 disposed above the inverter 54 for connecting the wiring board portion 463 with the inverter 54. The respective smoothing condensers 55 are attached to the wiring board portion 463 above the wiring board portions 464 and 465.

The entire disclosure of Japanese Patent Application No. 11-295658 filed on Oct. 18, 1999, including its specification, claims and drawings, and the entire disclosure of Japanese Patent Application No. 10-325038 filed Nov. 16, 1998, including its specification, claims and drawings, are incorporated herein by reference.

While the invention has been described with reference to the foregoing preferred embodiments, the foregoing embodiments are merely illustrative of the invention and should not be construed as limiting the invention. Various modifications and applications may be adopted by those skilled in the art without departing from the true spirit and scope of the invention as defined by the appended claims.

What is claimed is:

1. A drive unit for a vehicle comprising:
   a generator-motor arranged on a first axis;
   a drive motor arranged on a second axis in parallel with the first axis;
   a drive unit casing housing said generator-motor and said drive motor;
   an inverter unit for said generator-motor and said drive motor; and
   a smoothing condenser for smoothing power source voltage of said inverter unit;
   wherein said inverter unit is attached to said drive unit casing diametrically of said generator-motor and said drive motor and wherein said smoothing condenser is attached to an interior side of said drive unit casing with an end portion thereof projecting therefrom.

2. A drive unit according to claim 1, wherein said inverter unit comprises a first inverter for said generator-motor and a separate second inverter for said drive motor, said first and second inverters being respectively located proximate to said generator-motor and said drive motor.

3. A drive unit according to claim 2 wherein said smoothing condenser extends across a tangent common to said generator-motor and said drive motor.

4. A drive unit according to claim 1 wherein a portion of said smoothing condenser extends across a tangent common to said generator-motor and said drive motor.

5. A drive unit according to claim 1, wherein said drive unit casing has a partition wall for attaching said inverter unit and wherein said smoothing condenser projects from said partition wall along an axis oriented toward said generator-motor.

6. A drive unit according to claim 5, wherein the partition wall is formed with a bottomed recess projecting toward said generator-motor and the smoothing condenser is contained in said recess.

7. A drive unit for a vehicle comprising:
   a generator-motor arranged on a first axis;
   a drive motor arranged on a second axis in parallel with the first axis;
   a drive unit casing containing said generator-motor and said drive motor;
   an inverter for said generator-motor; and
   an inverter for said drive motor;
   wherein said inverter for said generator-motor and said inverter for said drive motor are attached to said drive unit casing diametrically disposed relative to the generator-motor and the drive motor and contiguous with each other.

8. A drive unit for a vehicle comprising:
   a generator-motor;
   a drive motor;

a drive unit casing housing said generator-motor and said drive motor;

a first inverter for operating one of said generator-motor and said drive motor;

a second inverter for operating the other of said generator-motor and said drive motor;

a first lead wire for connecting the one of said generator-motor and said drive motor to said first inverter; and a second lead wire for connecting the other of said generator-motor and said drive motor to said second inverter;

wherein said first and second inverters are attached to said drive unit casing at positions at which a sum of lengths of said first and second lead wires when said first lead wire and said first inverter are connected to each other and said second lead wire and said second inverter are connected to each other, is shorter than a sum of the lengths of said first and second lead wires when said first lead wire and said second inverter are connected to each other and said second lead wire and said first inverter are connected to each other.

9. The drive unit of claim 8 wherein said generator-motor is arranged on a first axis and said drive motor is arranged on a second axis in parallel with the first axis.

10. The drive unit of claim 8, wherein said first and second inverters extend in a plane in parallel with lines respectively tangential to said generator-motor and said drive motor.

11. The drive unit of claim 8, wherein said first and second inverters are respectively an inverter for said generator-motor and an inverter for said drive motor.

12. The drive unit to claim 8, wherein said first and second inverters are respectively an inverter for said drive motor and an inverter for said generator-motor.

13. A drive unit for a vehicle comprising:

a generator-motor;

a drive motor;

a drive unit casing housing said generator-motor and said drive motor;

a first inverter for operating one of said generator-motor and said drive motor;

a second inventer for operating the other of said generator-motor and said drive motor;

a first lead wire for connecting one of said generator-motor and said drive motor to said first inverter; and a second lead wire for connecting the other of said generator-motor and said drive motor to said second inverter;

wherein each of said first and second lead wires extend through said housing in a direction parallel to axes on which said generator-motor and said drive motor are oriented.

14. The drive unit of claim 9 wherein said generator-motor is arranged on a first axis and said drive motor is arranged on a second axis in parallel with the first axis.

15. The drive unit of claim 9, wherein said first and second inverters extend in a plane in parallel with lines respectively tangential to said generator-motor and said drive motor.

16. The drive unit of claim 9, wherein said first and second inverters are respectively an inverter for said generator-motor and an inverter for said drive motor.

17. The drive unit of claim 9, further comprising a differential unit and a gear train mounted within said drive unit casing for transmitting power of said drive motor to said differential unit, and wherein at least one of said first and second lead wires extends from at least one of said drive motor and said generator-motor along the axial length of said gear train.

18. A drive unit for a vehicle comprising:

a generator-motor;

a drive motor;

a drive unit casing containing said generator-motor and said drive motor;

a first inverter for operating one of said generator-motor and said drive motor; and a second inverter for operating the other of said generator-motor and said drive motor;

wherein said first and second inverters are arranged on an upper wall of the drive unit casing, said upper wall being inclined from a front side of the vehicle to a lower side of the vehicle.

19. A drive unit for a vehicle comprising:

a generator-motor;

a drive motor;

a drive unit casing containing said generator-motor and said drive motor;

a first inverter for operating one of said generator-motor and said drive motor;

a second inverter for operating the other of said generator-motor and said drive motor;

a partition wall within said drive unit casing for attaching said first and second inverters; and a heat sink formed on said partition wall.

20. The drive unit of claim 12, wherein said partition wall is a planar member.

* * * * *

UNITED STATES PATENT AND TRADEMARK OFFICE
CERTIFICATE OF CORRECTION

PATENT NO.    : 6,166,498
DATED         : December 26, 2000
INVENTOR(S)   : Yamaguchi et al.

Page 1 of 1

It is certified that error appears in the above-identified patent and that said Letters Patent is hereby corrected as shown below:

Title page,
Item [75] Inventors, "Kozo Yamaguchi, Tokyo-to" should read
-- Kozo Yamaguchi, Tokyo --.

Column 6,
Line 19, "inverted" should read -- inverter --; and
Line 41, "65" should read -- 61 --.

Column 7,
Line 12, "$L_{MV}$" (second occurrence) should read -- $L_{MW}$ --; and
Line 16, "generator20" should read -- generator --.

Column 14,
Line 1, "9" should read -- 13 --;
Line 4, "9" should read -- 13 --;
Line 9, "9" should read -- 13 --;
Line 12, "9" should read -- 13 --; and
Line 49, "12" should read -- 19 --.

Signed and Sealed this

Ninth Day of April, 2002

*Attest:*

*Attesting Officer*

JAMES E. ROGAN
*Director of the United States Patent and Trademark Office*